United States Patent
Wiberg et al.

(10) Patent No.: US 6,628,946 B1
(45) Date of Patent: Sep. 30, 2003

(54) METHOD AND APPARATUS FOR BROADCASTING SYSTEM INFORMATION IN A CELLULAR COMMUNICATIONS NETWORK

(75) Inventors: Niclas Wiberg, Linköping (SE); Thomas Rimhagen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/572,846

(22) Filed: May 18, 2000

Related U.S. Application Data

(60) Provisional application No. 60/135,125, filed on May 20, 1999.

(51) Int. Cl.⁷ .................................. H04Q 7/20
(52) U.S. Cl. ................ 455/434; 455/435; 455/436; 370/331
(58) Field of Search ................. 455/432, 434, 455/435, 445, 62, 343, 33.1; 370/347, 331

(56) References Cited

U.S. PATENT DOCUMENTS

| | | | |
|---|---|---|---|
| 5,224,152 A | | 6/1993 | Harte |
| 5,305,466 A | * | 4/1994 | Taketsugu .................. 455/435 |
| 5,404,355 A | * | 4/1995 | Raith ......................... 370/311 |
| 5,493,286 A | * | 2/1996 | Grube et al. ............... 340/7.25 |
| 5,581,244 A | | 12/1996 | Jokimies et al. |
| 5,613,209 A | * | 3/1997 | Peterson et al. ............ 455/518 |
| 5,621,732 A | * | 4/1997 | Osawa ....................... 370/346 |
| 5,842,128 A | * | 11/1998 | Kito et al. .................. 455/435 |
| 5,915,220 A | * | 6/1999 | Chelliah .................... 455/435 |
| 6,032,047 A | | 2/2000 | Cerwall et al. |
| 6,101,388 A | * | 8/2000 | Keshavachar ............... 455/435 |
| 6,119,000 A | * | 9/2000 | Stephenson et al. ........ 455/432 |
| 6,275,487 B1 | * | 8/2001 | Szalajski et al. ........... 370/347 |

FOREIGN PATENT DOCUMENTS

| | | |
|---|---|---|
| EP | 0 939 569 A1 | 9/1999 |
| WO | WO 95/26112 | 9/1995 |

OTHER PUBLICATIONS

3G TS 25.331 Version 3.1.0 Release 1999, "RRC Procedures", pp. 22–32.
Nortel Proposal Doc# Tdoc SMG 2 208/99, Apr. 1999, Dublin, Ireland, pp. 1–3.
Nortel Proposal Doc# Tdoc SMG2 207/99, Apr. 1999, Dublin, Ireland, pp. 1–15.

(List continued on next page.)

*Primary Examiner*—Nay Maung
*Assistant Examiner*—Tan Trinh
(74) *Attorney, Agent, or Firm*—Nixon & Vanderhye P.C.

(57) ABSTRACT

In a cellular telecommunications system or network, tags are associated with one or more system control parameters. For example, a given tag value may be indicative of particular values for one or more system information parameters. In each cell, a base station (BS) transmits or broadcasts currently valid tag values. System information blocks including the system information parameters themselves (which correspond to particular tag(s)) are also broadcast by base stations. A mobile station receiving a valid tag value from a base station determines whether or not it has to read system information block(s) corresponding to that tag value depending upon whether the base station has already stored or cached such block(s) corresponding to the tag value. As will be appreciated by those skilled in the art, different embodiments of the instant invention may result in the mobile station not having to re-read identical system information each time it changes cells, or while moving in the same cell. This may conserve radio resources and reduce battery consumption, thereby improving standby time of the mobile station.

32 Claims, 12 Drawing Sheets

OTHER PUBLICATIONS

Nortel Proposal Doc# Tdoc SMG2 209/99, Apr. 1999, Dublin, Ireland, pp. 1–33.

Nortel Proposal Doc# Tdoc SMG2 210/99, Apr. 1999, Dublin, Ireland, pp. 1–22.

Nortel Proposal Doc# Tdoc SMG2 228/99, Apr. 1999, Dublin, Ireland, pp. 1–6.

Nortel Proposal Doc# Tdoc SMG2 435/99, Apr. 1999, Dublin, Ireland, pp. 1–6.

PCS support in IS–54C, Andersson et al., Ericsson Radio Systems AB, pp. 114–118.

PCT International Search Report.

* cited by examiner

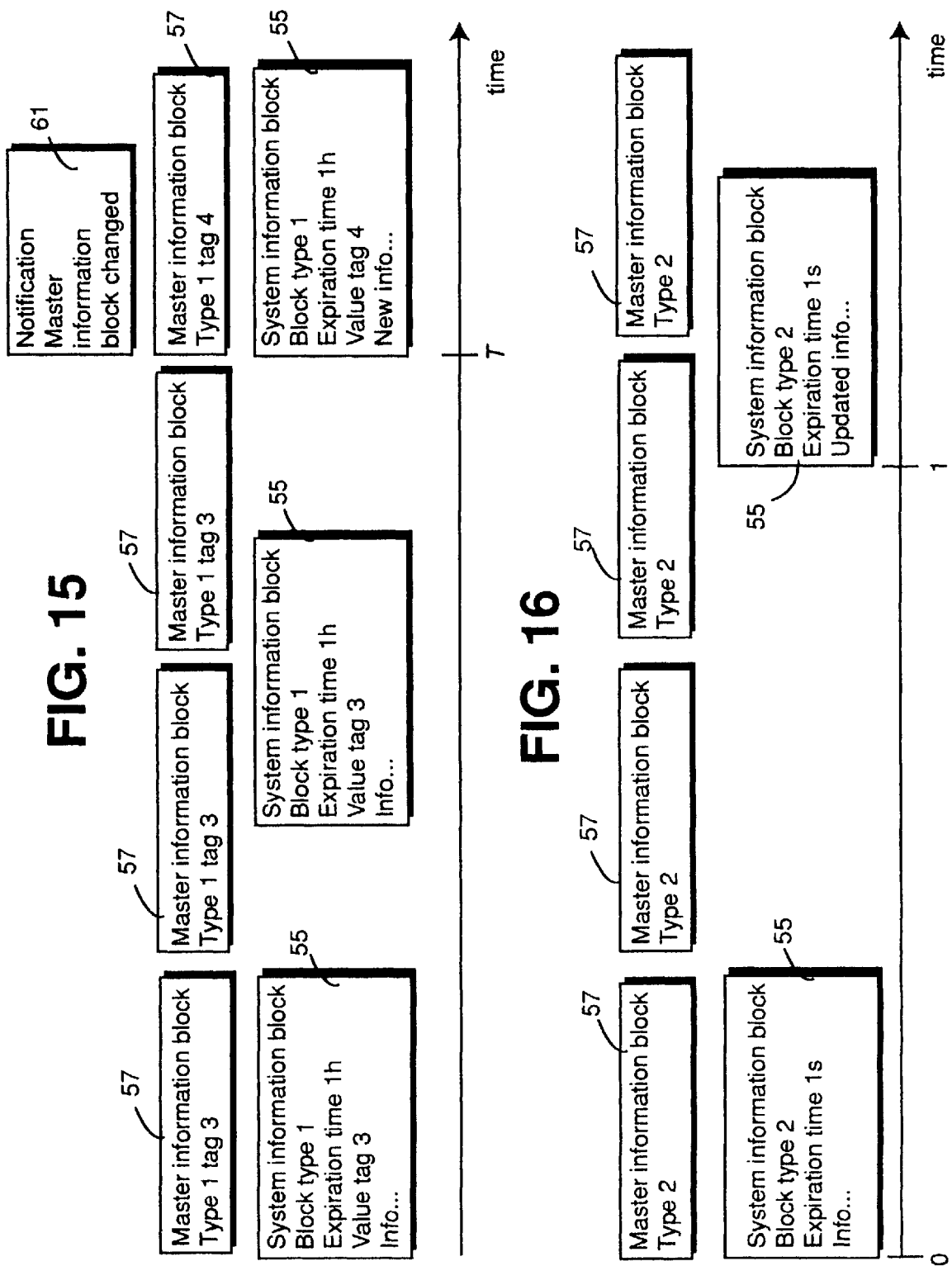

| System information block | Area scope | UE mode/state | Transport channel | Scheduling information | Additional requirements |
|---|---|---|---|---|---|
| Master information block | Cell | Idle mode, Connected mode | BCH | SIB_POS=0 FDD: SIB_REP= [8] TDD: SIB_REP= [8, 16, 32, 64] [SIB_OFF=1] | |
| | | CELL_FACH | FACH | Scheduling not applicable | |
| System information block type 1 | PLMN | Idle mode | BCH | Specified by the IE "Scheduling information" | |
| System information block type 2 | PLMN | Connected mode | BCH | Specified by the IE "Scheduling information" | |
| System information block type 3 | Cell | Idle mode, (Connected mode) | BCH | Specified by the IE "Scheduling information" | |
| System information block type 4 | Cell | Connected mode | BCH | Specified by the IE "Scheduling information" | If System information block type 4 is not broadcast in a cell, the connected mode UE shall read System information block type 3 |
| System information block type 5 | Cell | Idle mode, (Connected mode) | BCH | Specified by the IE "Scheduling information" | |
| System information block type 6 | Cell | Connected mode | BCH | Specified by the IE "Scheduling information" | If System information block type 6 is not broadcast in a cell, the connected mode UE shall read System information block type 5. If some of the optional IEs are not included in System information block type 6, the UE shall read the corresponding IEs in System information block type 5 |
| System information block type 7 | Cell | Idle mode and Connected mode | BCH | Specified by the IE "Scheduling information" | |

FIG. 17(a)

| System information block type 8 | Cell | Connected mode | BCH | Specified by the IE "Scheduling information" | |
|---|---|---|---|---|---|
| System information block type 9 | Cell | Connected mode | BCH | Specified by the IE "Scheduling information" | |
| System information block type 10 | Cell | CELL_DCH | FACH | | This system information block shall only be acquired by UEs with certain capabilities (DRAC). If the system information block is not broadcast in a cell, the DRAC procedures do not apply in this cell. |
| System information block type 11 | Cell | Idle mode (Connected mode) | BCH | Specified by the IE "Scheduling information" | |
| System information block type 12 | Cell | Connected mode | BCH | Specified by the IE "Scheduling information" | If some of the optional IEs are not included in system information block type 12, the UE shall read the corresponding IEs in system information block type 11. |
| System information block type 13 | Cell | Idle mode, Connected mode | BCH | Specified by the IE "Scheduling information" | |
| System information block type 13.1 | Cell | Idle mode, Connected mode | BCH | Specified by the IE "Scheduling information" | |
| System information block type 13.2 | Cell | Idle mode, Connected mode | BCH | Specified by the IE "Scheduling information" | |
| System information block type 13.3 | Cell | Idle mode, Connected mode | BCH | Specified by the IE "Scheduling information" | |
| System information block type 13.4 | Cell | Idle mode, Connected mode | BCH | Specified by the IE "Scheduling information" | |
| System information block type 14 (TDD) | Cell | Idle mode, Connected mode | BCH, FACH | Specified by the IE "Scheduling information" | |

FIG. 17(b)

METHOD AND APPARATUS FOR BROADCASTING SYSTEM INFORMATION IN A CELLULAR COMMUNICATIONS NETWORK

This is a continuation of U.S. Provisional Application Serial No. 60/135,125, filed May 20, 1999, the disclosure of which is hereby incorporated herein by reference, and priority on which is hereby claimed.

FIELD OF THE INVENTION

The present invention relates to a system and corresponding method for broadcasting system information in a cellular communications network.

BACKGROUND OF THE INVENTION

In a typical cellular communications system, a geographical area is divided into several "cells" each of which is served by a base station (BS) having a limited radio coverage area. Base stations are in turn connected to a mobile services switching center(s) (MSC) which is, in turn, connected to a landline public switched telephone network (PSTN). Each user (mobile subscriber) in the cellular radio system or network is provided with a portable, pocket, handheld, or car mounted mobile station (e.g., cell phone) which communicates voice information and/or data with a nearby base station which defines the cell in which the mobile station (MS) is located. The MSC with which the base station is in communication switches calls and controls signaling between the mobile station (MS) and other mobile stations in the system or landline telephones in the PSTN.

The wireless communications link (e.g., radio interface) between a mobile station and corresponding base station includes a number of different logical channels which may be separated into two broad categories: traffic channels and control channels. Traffic channels are utilized by a serving base station controller to communicate call data (e.g., voice data) with a particular MS travelling within the cell defined by the base station. Control channels are utilized by the serving base station controller to communicate control data (e.g., system information) necessary to implement the connection of call data with the MS. Exemplary control channels include broadcast channels (BCH), Common Control Channels (CCCH) and Dedicated Control Channels (DCCH). Each of the above three categories of control channels may still further be sub-divided into a number of logical channels for transporting different types of information between the serving base station (BS) and a mobile station (MS). Broadcast control channels, for example, may be used to broadcast general system information about the cell defined by the broadcasting base station to mobile stations located within or near the cell.

In a cellular communications system or network, system information parameters are defined in order to provide network configuration, adaptation, and optimization possibilities. Certain of these parameter values must be known by a mobile station (MS) before a first access attempt can be made by that MS. Therefore, the parameters (cell parameters or system information parameters) are typically constantly broadcast via control channel(s) in every cell of the network in the form of system information messages, and a mobile station (MS) typically must wait until it has successfully received all necessary system information parameters from the BS before performing an access attempt. Exemplary cell parameters (or system information parameters) include cell descriptions, location area identity, neighboring cell description or relation, physical cell parameters, cell traffic load, traffic measurement information and/or core network information. For purposes of simplicity, certain cell or system information parameters herein may be referred to by the reference characters "M", "N", "R", "S", "T", "X", "Y", and/or "Z".

The amount of system information in today's cellular systems or networks is significant. The need for a MS to read all such information tends to create delays for the MS at registration for or at its access attempts following a cell change (a cell change is when a MS moves from one cell to another). Furthermore, when an MS is in an idle or standby mode, it typically needs to check the system information at regular time intervals so as to be kept up-to-date regarding the same. This reading of system information by many mobile stations throughout the network requires significant radio resources and reduces battery life of the individual mobile stations as well as the corresponding maximum standby time available to each MS.

A cellular network operator may often choose to use constant values for many of the system information parameters in a group of cells or even throughout the entire network. In such situations, since the MS does not know which system parameters have changed and which have not, it has to re-read all of the system information continuously or at each cell change.

Thus, it will be apparent from above that problems with broadcasting system information in conventional cellular communication networks include the following. First, an MS is forced to reread (e.g., at each cell change) system information parameters that may in fact be identical to earlier read parameters. This is not an efficient use of resources. Second, reading vast amounts of system information requires significant radio resources in an MS and the overall network, and may have a significant adverse impact on battery consumption of the MS. Third, system information parameters may be defined by a particular standard, and thus be difficult to change later in time when new features and/or parameters may be introduced in the system. Fourth, a sequential order of sending/transmitting system information blocks by base stations may be defined by a standard and thus be difficult to change at later point(s) in time when new features and/or parameters are introduced into the system.

One approach to resolving, inter alia, the second problem discussed above is set forth in commonly assigned U.S. Pat. No. 5,404,355, the disclosure of which is hereby incorporated herein by reference. In the '355 patent, system information elements are grouped and change flags are provided to indicate whether values of information elements have changed. The change flag and information element are transmitted on a control channel. Accordingly, a MS only has to read the system information one time in a given cell provided that the information does not change. However, the system of the '355 patent has its problems as well. For example, it does not eliminate the need for mobile stations to read all system information parameters when switching cells (i.e., at cell change). Instead, a MS must read all system information any time it locks onto a new control channel (e.g., at cell change).

In view of the above, it will be apparent to those skilled in the art that there exists a need in the art for a system and/or corresponding method which enables one or more of the aforesaid four problems to be addressed. For example, there exist a need in the art for a system and/or method for reducing the need for a mobile station (MS) to re-read system information parameters at cell change when such parameters have, in fact, not changed at all from one cell to another.

SUMMARY OF THE INVENTION

In a cellular telecommunications system or network, system information is broadcast from a UTRAN to idle mode and/or connected mode mobile stations in a cell. In essence, the system information may be organized as a tree, including master information block(s) and underlying system information blocks. A master information block, broadcast on a master channel, provides a receiving MS with reference(s) to a number of system information blocks in a cell, including scheduling information for those system information block(s). A system information block(s) groups together system information elements of the same or similar nature. Different system information blocks that are broadcast may have different characteristics, e.g., regarding their repetition rate and/or requirements on MSs to re-read system information blocks. The system information blocks contain actual system information parameters and/or references to other system information block(s) including scheduling information for those system information block(s).

In certain embodiments, tags are broadcast in master information blocks. Tags are each associated with one or more system parameters. For example, a given tag value may be indicative of particular values for three separate system information parameters. In each cell, a base station (BS) transmits or broadcasts currently valid tag values for that cell on a control channel. System information blocks including the system information parameters themselves are in turn broadcast by the base station (BS) in each cell on the same or other control channel(s). When a mobile station (MS) enters a new cell and locks onto a new control channel, it reads the valid tag value(s) in that new cell via the master control channel. If the MS determines that it already has stored and/or is using the system information parameters corresponding to all valid tag values, then there is no need for the MS to read the system information parameters in the new cell at cell change. If, however, the MS determines that it does not have stored certain system information parameters corresponding to valid tag value(s) in the new cell, then the MS reads the necessary system information parameters. Thus, in certain embodiments of this invention, the use in a cell of several tags is provided with each tag including part of the system information; thereby making it possible to change a subset of tags in a cell and thus making it possible for a MS to only have to read the relevant new system information.

As will be appreciated by those skilled in the art, different embodiments of the instant invention may result in one or more of the following advantages. For example, the MS does not have to re-read identical system information each time it changes cells, or while moving in the same cell. This saves radio resources and reduces battery consumption in the MS thereby improving the standby time of the MS. Another advantage is that delay associated with reading all new system information parameters at each cell change may be reduced by re-using cached (i.e. stored) system information parameters when valid tag value(s) do not change at cell change. Only new system information parameters not already being stored by the MS need be read by the MS at cell change in certain embodiments.

BRIEF DESCRIPTION OF THE DRAWINGS

The foregoing and other objects, features, and advantages of the invention will be apparent from the following description of preferred example embodiments as well as illustrated in the accompanying drawings in which reference numerals refer to like parts. While individual functional blocks and components are shown in many of the figures, those skilled in the art will appreciate that these functions may be performed by individual hardware circuits, by a suitably program digital microprocessor(s) or general purpose computer(s), by an Applications Specific Integrated Circuit (ASIC) and/or by one or more digital signaling processes.

FIG. 15 is a graph according to an embodiment of this invention illustrating how a mobile station (MS) receives new system information parameters upon detecting a change in valid tag value(s) in a particular cell.

FIG. 16 is a graph illustrating an embodiment of this invention wherein tag values are not provided, and a mobile station (MS) receives system information parameter data via periodic updates; this embodiment preferably utilized for system information parameters/elements which are valid for short periods of time.

FIG. 17(*a*) is a graph/table illustrating characteristics of exemplary system information blocks and master blocks according to an embodiment of this invention.

FIG. 17(*b*) is a continuation of FIG. 17(*a*).

DETAILED DESCRIPTION OF THE DRAWINGS

In the following description, for purposes of explanation and not limitation, specific details are set forth such as particular embodiment, network architectures, signaling flows, protocols, techniques, etc. in order to provide an understanding of the present invention. However, it would be apparent to those skilled in the art that the present invention may be practiced in other embodiments that depart from these specific details. For example, although the present invention is disclosed in the example context of a mobile radio Code Division Multiple Access (CDMA) communications system, it may also be employed in other types of communications systems such as Time Division Multiple Access (TDMA), and the like. In certain instances, detailed descriptions of well-known methods, interfaces, devices, protocols, and signaling techniques are omitted so as to not obscure the description of the present invention with unnecessary detail.

Figure 1:
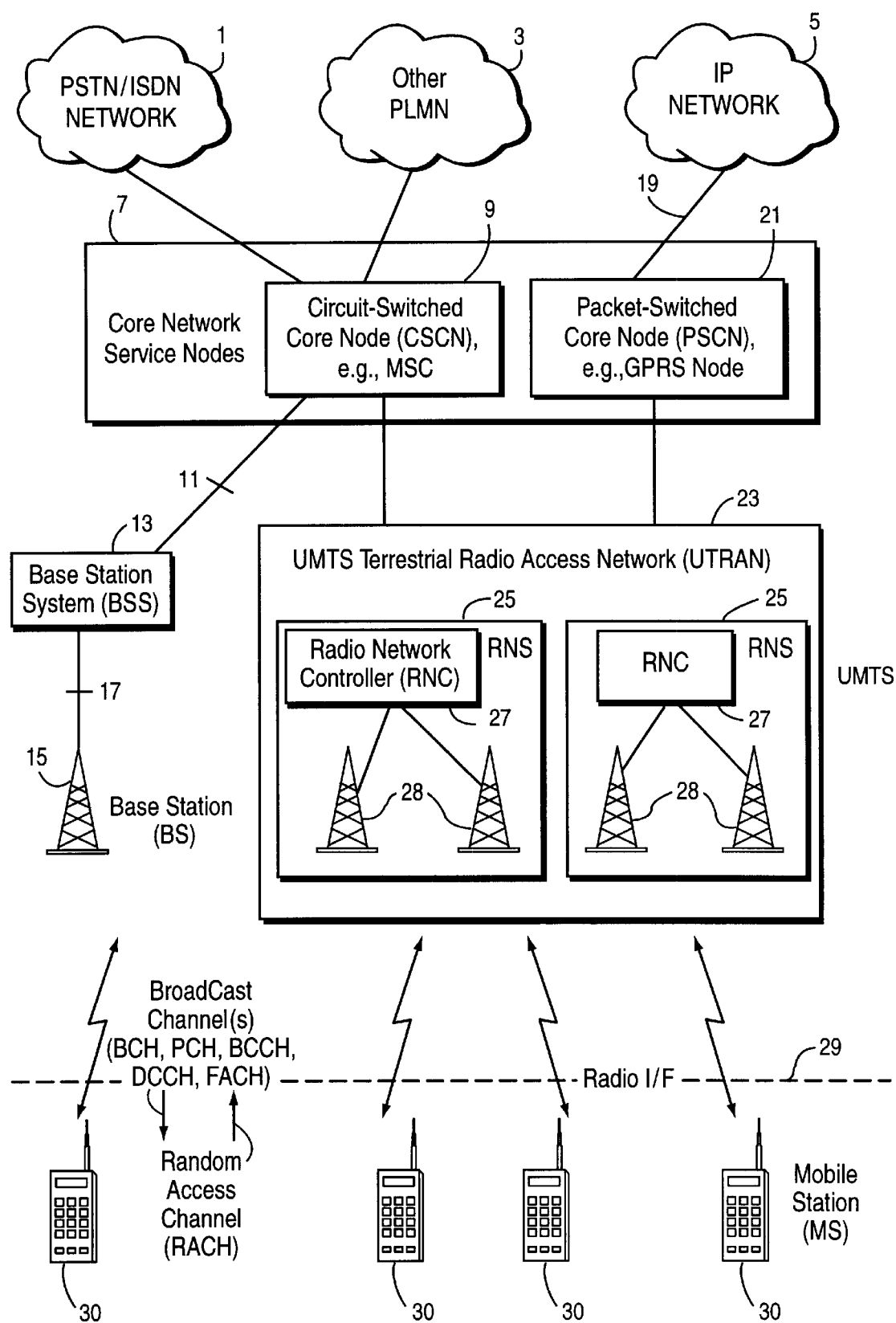
FIG. 1 is a functional block diagram illustrating a Universal Mobile Telephone System (UMTS) in which the present invention may be employed.

FIG. 1 illustrates an exemplary context of a universal mobile telecommunications system (UMTS) in which the instant invention may be implemented. A representative, circuit switched, external core network 1 may be, for example, the Public Switched Telephone Network (PSTN) and/or the Integrated Services Digital Network (ISDN). Another circuit switched, external core, network may correspond to another Public Land Mobile radio Network (PLMN) 3. A representative, packet switched, external core network 5 maybe, for example, an IP network such as the Internet. The core network(s) are coupled to corresponding network service nodes 7. The PSTN/ISDN network 1 and/or other PLMN networks 3 are connected to a Circuit Switched Core Node (CSCN) 9, such as a mobile switching center (MSC), that provides circuit switched services. The UMTS may co-exist with an existing cellular network, such as the Global System for Mobile communication (GSM), where MSC 9 is connected over interface 11 to a base station subsystem 13 which in turn is connected to radio base station (BS) 15 over interface 17.

The packet switched network 5 is connected over interface 19 to a Packet Switched Core Node (PSCN), e.g., a General Packet Radio Service (GPRS) node, 21 tailored to provide packet switched type services in a context of GSM which is sometimes referred to as the serving GPRS service node (SGSN). Each of these core network service nodes 9, 21 also connects to the UMTS terrestrial radio access network (UTRAN) 23 over a radio access network interface. The UTRAN 23 includes one or more Radio Network Systems (RNS) 25 each with a radio network controller (RNC) 27 coupled to a plurality of base stations (BS) 28 and to other RNCs in the UTRAN 23. Each BS 28 includes, among other things, at least one transceiver and a base station controller.

Preferably, radio access over radio interface 29 is wireless and is based upon wideband CDMA (WCDMA) with individual radio channels allocated using CDMA channelization or spreading codes. Of course, other access methods may instead be employed, such as TDMA or any other type of CDMA. WCDMA provides wide bandwidth and other high transmission rate demands as well as robust features like diversity handoff to ensure high quality communication services in frequently changing environments such as when cell changes are made. Each mobile station (MS) 30 may be assigned its own scrambling code in order for a BS 15, 28 to identify transmissions from that particular MS 30, or alternatively an MS may use the base station's scrambling code together with an MS-specific channelization code. Each MS may also use its own scrambling code to identify transmissions from base station(s) 15, 28 either on a general broadcast or common channel, or transmissions specifically intended for that MS.

As discussed above, radio transmissions of each base station (BS) 15, 28 cover a geographical area known as a "cell." Each BS 15, 28 defines a cell having one or more sectors. Each MS 30 in a cell defined by a particular BS communicates with at least that BS over the wireless radio interface 29. As will be made apparent below, this invention deals primarily with communications between base station (s) 15, 28 and mobile station(s) 30 via wireless interface 29.

Figure 2:
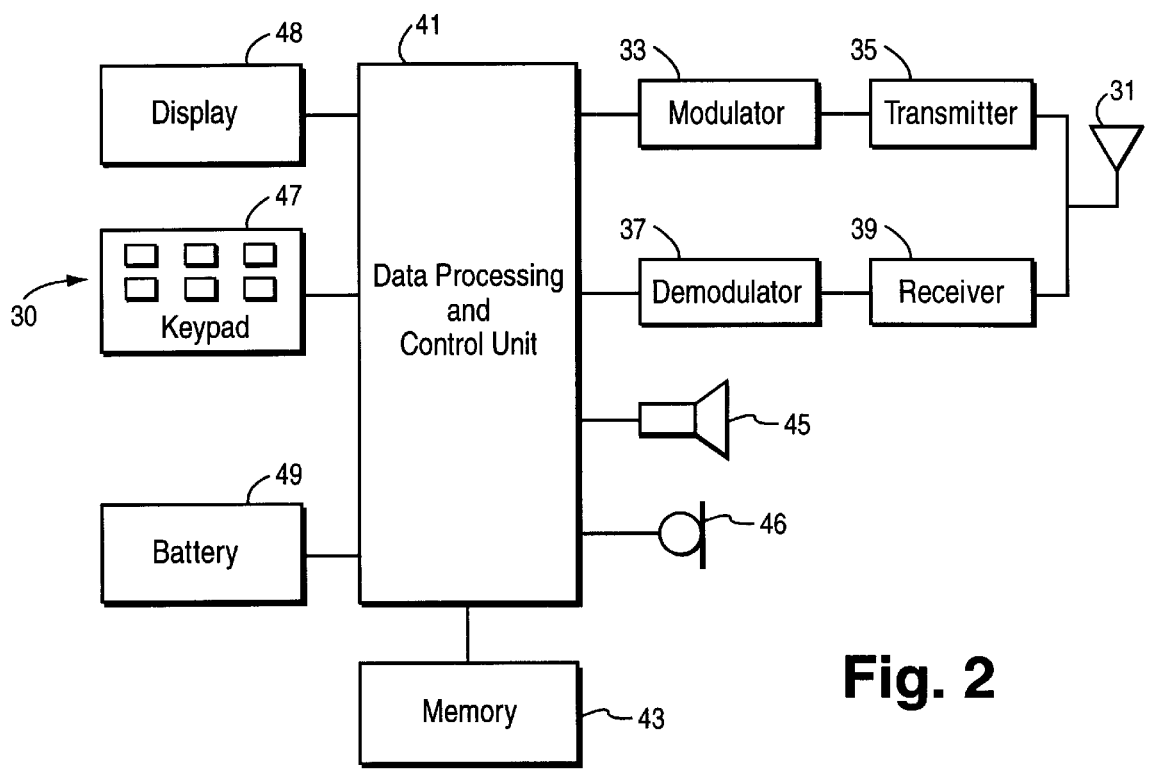
FIG. 2 is a functional block diagram of a Mobile Station (MS) which may be utilized in the FIG. 1 network/system in certain embodiments of this invention.

FIG. 2 is a simplified functional block diagram of an exemplary MS 30 which may be utilized in the system/network of FIG. 1, and thus in certain embodiments of this invention. MS 30 includes antenna 31 for transmitting signals to, and for receiving signals from, a base station(s) 15, 28 over radio interface 29. Antenna 31 is coupled to radio transceiving circuitry including modulator 33 coupled to transmitter 35 and demodulator 37 coupled to receiver 39. Radio transceived signals may include control signals on master and/or slave control channels as described hereinafter, as well as traffic signals. Data processing and control unit 41 and memory 43 include the circuitry for implementing audio, logic, and control functions of the MS 30. Memory 43 stores programs, data, and system information parameter caches as will be described hereinafter (e.g., system information blocks and/or system information values corresponding to valid tag values). Conventional speaker or earphone 45, microphone 46, keypad 47, and display 48 are coupled to data processing and control unit 41 to make up the user interface of the MS 30 (e.g., cell phone). Battery 49 may be used to power the various circuits required to operate MS 30. As will be appreciated from embodiments of this invention set forth below, the life of battery 49 may be prolonged due to inventive aspects of this invention.

Figure 3:
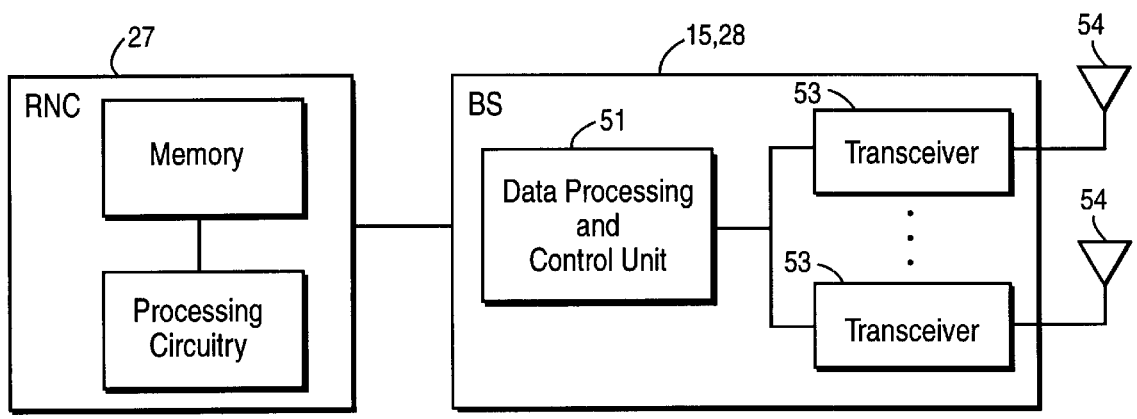
FIG. 3 is a functional block diagram of a Radio Network Controller (RNC) and corresponding base station (BS) which may be utilized in the system/network of FIG. 1 in certain embodiments of this invention.

FIG. 3 illustrates a simplified block diagram of an exemplary base station (BS) 15, 28 in communication with a RNC 27. As illustrated, each BS includes a data processing and control unit 51 which, in addition to performing processing operations relating to communications with RNC 27, may perform a number of measurement and control operations associated with base station radio equipment including transceivers 53 connected to one or more antennas 54. Base stations 15, 28 may be ATM (asynchronous transfer mode) based in certain embodiments, so that in each base station the control unit 51, transceiver(s) 53, and exchange terminals may be interconnected via an ATM switch core. Control unit 51 may also function to control what information is transmitted on various control channels from the BS, and when such information is transmitted.

According to this invention, through the use of "tags" to identify system information blocks with equal contents, the same system information blocks may be commonly shared more often resulting in lower access delays and lower power consumption by a MS 30 at cell changes. Such sharing of system information between cells and the flexible condition of network areas that share parameters are significant advantages associated with certain embodiments of this invention. System information parameters stored in memories 43 of respective mobile stations 30 may be used by a MS 30 in more than one cell depending upon system information parameter grouping and network division. In each cell the defining BS may broadcast a list of valid tag values for that cell to mobile stations 30 in the cell on a control channel. Based on the valid tag values being broadcast, the receiving MS 30 may or may not have to read system information parameters also being broadcast by the BS which correspond to the valid tag values, depending on whether or not the MS already has stored the parameters corresponding to the tag values which are valid in the cell in which the MS is located.

Accordingly, certain embodiments of this invention take advantage of the fact that many cells of a cellular communications network are configured in similar manners. However, the specific geographic areas or cells that share the configuration settings (and thus potentially the same system information parameters) are network specific and typically not known at the time a standard is established. In particular, these areas may not be identical to already defined logical areas such as location/routing areas, but may instead depend upon dynamic factors such as the environment (e.g., traffic or geographical) or the type of hardware employed. In accordance with this invention, system information may be shared in areas that are defined by the cellular network operator.

In certain embodiments, the cellular network operator may decide how the system information parameters are to be grouped for broadcasting over various cell control channels. In other words, the parameter groupings may be specified over a cell's broadcast control channel(s) rather than in a standard specification. As a result, in certain embodiments it may be possible for a network operator to make a more efficient grouping for a particular network or sub-network than was a possible to foresee at the time a standard was drafted. Thus, in certain embodiments the system and/or method according to certain embodiments of this invention may provide flexibility for future standard evolution responding to future needs.

Figure 4:
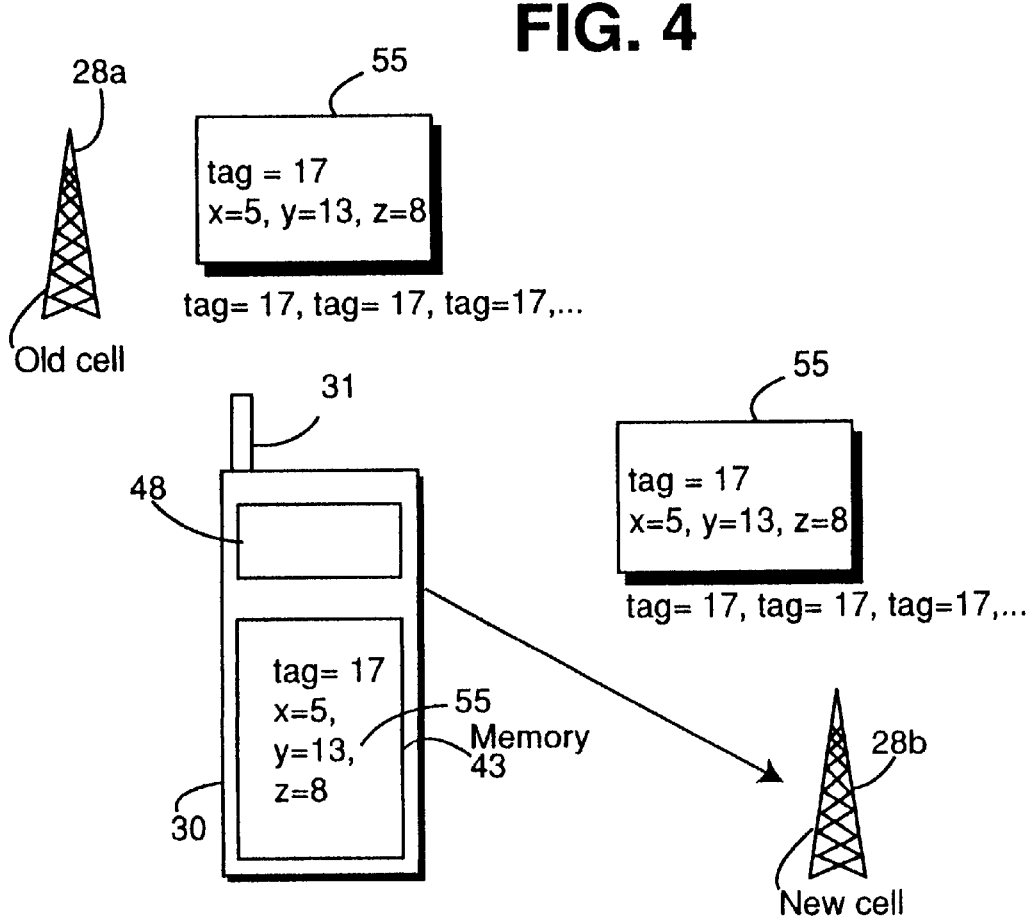
FIG. 4 is schematic diagram according to an embodiment of this invention illustrating that a MS does not have to re-read still-valid system parameters upon making a cell change (e.g., when the valid tag value remains the same from the first cell to the second cell).

According to an embodiment of this invention, FIG. 4 illustrates a mobile station (MS) 30 which is in the process of moving from a first cell defined by base station (BS) 28a (old cell) to a second cell defined by base station (BS) 28b (new cell). BS 28a in the old cell broadcasts tag value(s) (e.g., tag value 17) which are valid for the old cell on a master control channel. As illustrated in FIG. 4, base station 28a is continuously broadcasting on its master control channel that tag value 17 is valid in the old cell. Base station 28a broadcasts on other control channel(s), e.g., slave channel(s), at least one system information block 55 which that includes system information parameter(s) that correspond to tag value 17. In the FIG. 4 embodiment, the following values for system information parameters X, Y, and Z are broadcast in block 55: X=5, Y=13, and Z=8 (i.e., these parameters correspond to the tag value of 17).

While master and slave channels may be used in certain embodiments described herein to transmit the master block (s) 57 and the system information blocks 55, respectively, it is noted that this need not be the case in all embodiments of this invention. For example, in certain embodiments of this invention, the master blocks (i.e., header blocks) 57 and the system information blocks 55 may be transmitted on the same control channel.

As shown in FIG. 4, tag value 17 is also valid in the new cell defined by base station 28b. In other words, the same system information parameters (X=5, Y=13, and Z=8) are valid and used in both the old cell and the new cell. Thus, base station 28b is also transmitting information indicating that tag value 17 is valid on a master control channel, and is transmitting at least one system information block 55 on one of its slave control channel(s).

Still referring to FIG. 4, when in the old cell defined by base station 28a, MS 30 utilizes parameters X=5, Y=13, and Z=8. MS 30 only needs to monitor the master control channel in the old cell for a change in these parameters. As long as base station 28a broadcasts that tag value 17 is valid in that cell, the MS 30 need not monitor or re-read the system information blocks 55 broadcast or transmitted over the other control channel(s) such as slave channel(s) when in that cell. When MS 30 moves from the old cell to the new cell, the MS locks onto the master control channel of the new base station 28b (i.e., a new master control channel). Upon determining that base station 28b is transmitting on its master control channel information indicating that tag value 17 is valid in the new cell, the MS 30 determines that it has already stored the system information parameters corresponding to that tag value and thus realizes that it can use the same system information parameters that it was using in the old cell. Thus, it is not necessary for MS 30 to read or re-read the system information parameters via blocks 55 on the other control channels being transmitted by base station 28b in the new cell. This reduces the steps needed to be performed by MS 30 upon making a cell change, thereby reducing power consumption and/or enabling more speedy access requests by the MS in the new cell.

In a given cell, tag value(s) is/are changed whenever the system information parameters which are valid in the cell is/are changed. Alternatively, tag values that are valid may change from one cell to another cell. Mobile stations 30 may store or cache received system information blocks 55 in memory 43 for possible use in the cell in which the MS is located as well as for future use in other cells. The same tags (and thus the system information parameter value(s) corresponding thereto) may be valid for any flexibly defined group of cells, e.g., a location area including a plurality of cells, a routing area or an entire cellular communications network. In a given cell, the tags that are valid in that cell and other time critical parameters may be broadcast on a master control channel by the serving BS, and one or more slave channels may be utilized by the BS to broadcast the actual system information blocks 55 which correspond to the valid tags, including the values for the parameters themselves.

When mobile stations 30 make a cell change, it is important to quickly notify or inform the mobile stations which tag(s) are valid in the new cell. Therefore, that information is sent on a specific channel, here referred to as the master channel. The information about the valid tags is sent via header blocks 57 (see FIGS. 7–8). Each header block may include, for example, all tag values which are currently valid in that cell. In addition to the header blocks, the system information parameters which correspond to the respective valid tag values are divided into system information blocks 55 which are transmitted by the base station on one or more other channels potentially with different bit rates, here referred to as slave channels. Master and slave channels herein may be different logical, transport, or even physical channels. However, it is preferred that the MS 30 need only read one of these channels (i.e., the master channel) upon entering a new cell without having to spend the time or resources to read other channels such as slave channels.

Figure 5:
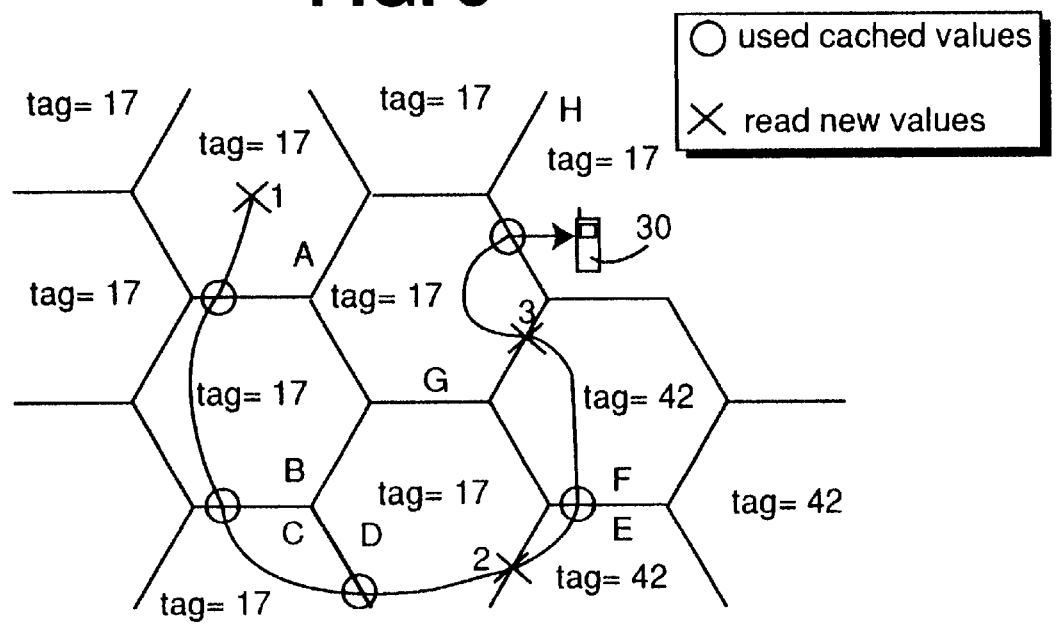
FIG. 5 is a schematic diagram according to an embodiment of this invention illustrating the path of an MS through a plurality of cells in the system/network of FIG. 1, where the MS sometimes needs to read new system information parameters upon making a cell change and sometimes does not.

FIG. 5 illustrates a plurality of cell changes as MS 30 moves from cell to cell through a network where different tags are used in different cells for different blocks of system information. MS 30 starts in cell A, then moves to cell B, then to cell C, to cell D, to cell E, to cell F, to cell G, and finally to cell H. Each cell is defined by its own base station 28. Cells A and B in FIG. 5 are the same as the old cell and new cell shown in FIG. 4. Referring to FIGS. 4–5, tag value 17 (and thus parameters X=5, Y=13, and Z=8) is valid in each of cells A, B, C, D, G, and H, but is not valid in cells E and F. Instead, tag value 42 is valid in cells E and F. MS 30 may cache or store system information blocks 55 so that the same system information which is stored may be used in the future by the MS when changing from one cell to another cell with the same system settings, without having to re-read the parameters from a control channel broadcast by the relevant BS in the new cell.

As shown in FIG. 5, circles "O" at cell interfaces (i.e., cell changes by the MS 30) illustrate that when moving from one cell to another where the same tag value(s) is/are valid, the MS may simply use cached system information parameters instead of having to read new system information parameter values. When changing cells, the MS drops the master control channel from the old cell and locks onto the new master control channel of the BS of the new cell. The MS reads from the master control channel of the new cell the tags that are valid in the new cell. If the MS determines that it is already storing parameter values corresponding to the tag values valid in the new cell, then the MS can use those values without having to first read or re-read those parameter values in the new cell.

However, when moving from cell D to cell E (i.e., where the valid tag value changed at the time of cell change) the "x" at the cell interface indicates that the MS 30 must read new system information parameter values once in cell E because it had not previously stored the same. For example, at the three locations marked with x's or crosses in FIG. 5, it may be necessary for the MS to read new system information parameter values from the network; namely at cross number 1 which is at registration; at cross number 2 when moving from cell D into cell E where valid tag value(s) change and thus new system information parameter(s) are utilized, and again at cross 3 when moving from cell F into cell G when changing back again. At the cell change from cell D to cell E, the MS locks onto the new master control channel of cell E and reads that tag 42 is valid in the new cell E. The MS determines that it is not currently storing system information parameters or parameter values corresponding to tag 42, and thus determines that it must access slave channel(s) in cell E to read the new system information parameter values which correspond to tag 42 before such values may be utilized by the MS in the new cell E.

In certain embodiments of this invention, MS 30 may be configured so as to store or cache system information blocks 55 from many different cells in memory 43, so that the MS 30 can use stored or cached parameter values when returning to a previously visited cell or to a cell utilizing tag value(s) of a previously visited cell, even if cells with different values were visited in between. In other words, the reading of new system information values as cross 3 in FIG. 5 may be avoided in such embodiments (i.e., the MS may have stored the parameters for tag value 17 of cell G when previously in any of cells A–D). In such embodiments, when in cell A for example, MS 30 stores a system information block 55 in memory 43 which corresponds to tag value 17. The MS 30 maintains this block 55 in its memory as it travels from cell A through cells B–H. Thus, the MS does not have to re-read new system information blocks 55 from slave channel(s) when entering cells B, C, and D. Still further, because the block 55 corresponding to tag 17 was maintained in memory 43 when the MS 30 was in cells E and F (even though the block was not used in those two cells), once the MS travels into cell G and determines that tag value 17 is again valid, the MS can simply retrieve block 55 corresponding to tag value 17 from its memory without having to re-read system information blocks 55 from slave control channel(s) in cell G. This may further reduce battery consumption and improve the efficiency of cell changes.

In certain embodiments, when a MS 30 is turned off and later turned on again, it may use stored or cached parameter values if it still resides in the same cell or cell group and/or if the same tag(s) is/are still valid. When the MS is turned on or changes cells, it simply checks to see which tags are valid in the new cell (or cell in which it was turned on in) as indicated on the master control channel utilized by the base station 28 for the new cell in which the MS is located. If the MS has already stored parameters for all valid tags for the new cell, the MS may simply enter into or resume a battery saving sleep mode. However, if the MS 30 has not already stored parameters for tags listed as valid in the new cell, then the MS reads the corresponding information through system information blocks 55 being broadcast or otherwise transmitted on slave control channel(s) in the new cell.

While FIGS. 4–5 illustrate only a single tag value being transmitted by a base station in each cell, multiple tag values may be valid in each cell according to certain embodiments of this invention. Thus, several system information blocks 55 maybe used simultaneously in the same cell in order to efficiently handle parameters that vary in different ways. For example, some parameters may be constant throughout a location area or routing area, while other parameters are constant only in the cells of one cell site (a cell site may consist of several, e.g., three, different cells in certain embodiments).

Figure 6:
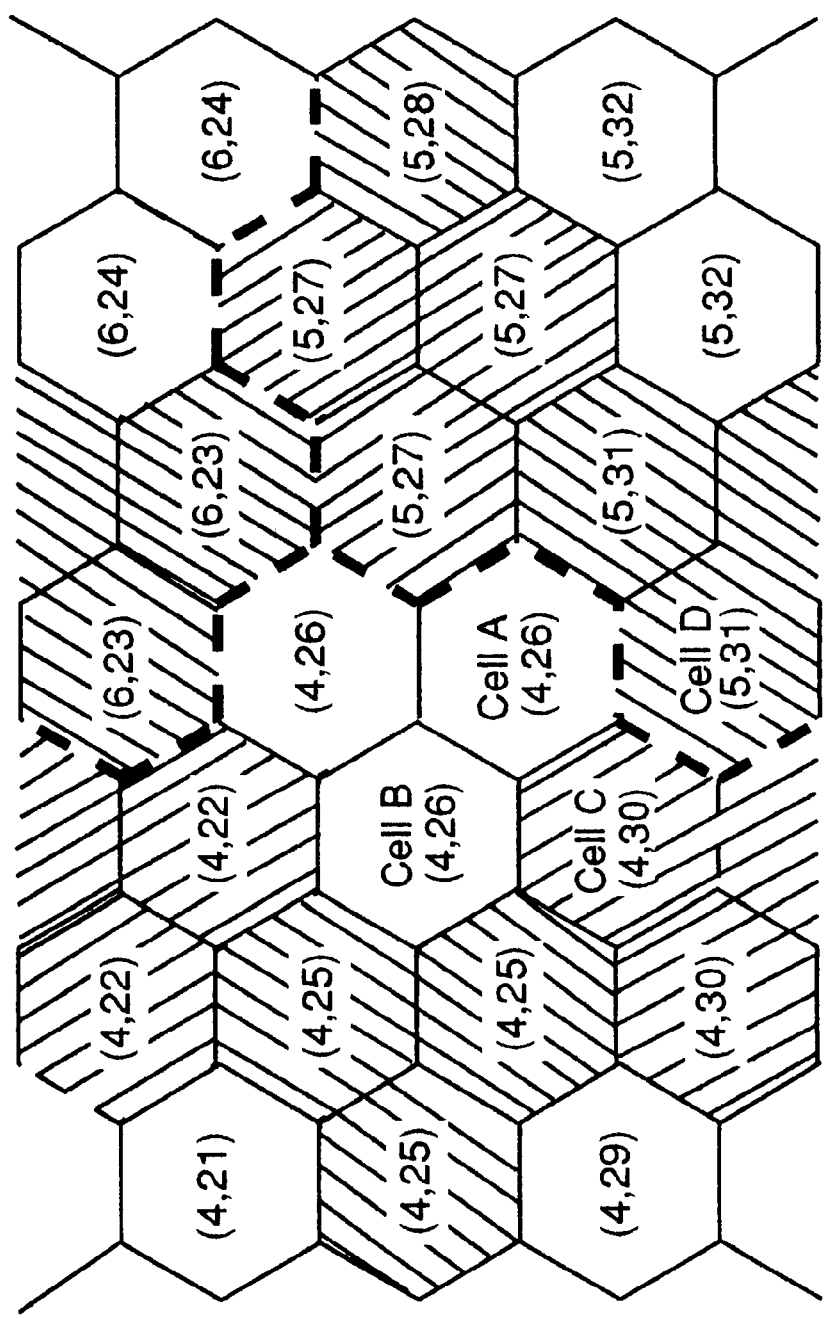
FIG. 6 is a schematic diagram illustrating a plurality of cells of the system/network of FIG. 1 with three separate cell groupings being illustrated; each cell grouping having at least one valid tag in common with other cells in that particular grouping.

FIG. 6 illustrates a network including a plurality of cells, where tag values 4, 5, and 6 correspond to system information blocks which are valid in larger areas. These larger areas are divided by the dotted or dashed borders shown in FIG. 6 (i.e., the network shown in FIG. 6 is divided into three separate large cell areas). In the first cell area (including a plurality of cells as illustrated), tag value 4 is valid in all cells. In the second cell area, tag value 5 (but not tag value 4) is valid in all cells. In the third cell area, tag value 6 (but not tag values 4 or 5) is valid is all cells. Cells A, B, and C in FIG. 6 are all in the first cell area, while cell D is in the second cell area. In certain embodiments, each cell site (e.g., group of three cells using common tag value(s) illustrated by shading in FIG. 6) may have its own system information block with a unique cache tag.

Still referring to FIG. 6, each illustrated cell has two valid tag values and thus two valid information blocks (e.g., cell C has two valid tag values, namely 4 and 30). Some system information parameters are shared by a group of cells in large areas (e.g., divided by the dotted or dashed lines in FIG. 6). The corresponding tag values are illustrated as the left most number in each cell (tag values 4, 5, and 6). Other system information parameters are in blocks 55 shared by lesser number(s) of cells. For example, tag value 26 is shared only by the three cells of a particular cell site in the first cell area. The cache tags corresponding to this second block are shown as the right-most number in each cell. Thus, for example, when a mobile station 30 moves from cell A into cell B in FIG. 6, no system blocks 55 on slave channels need to be read by the MS because the MS determines from the BS in cell B that tags 4 and 26 are still valid (i.e., no new tags are valid upon the cell change). However, when an MS moves from cell A to cell C in FIG. 6, the MS determines that new tag value 30 is valid so that the MS has to read a new system information block(s) 55 corresponding to tag value 30 upon entering cell C (unless the block corresponding tag value 30 has been previously stored or cached by the MS), but does not have to read a block 55 corresponding to tag value 4 because that tag value remains valid through the cell change. Still referring to FIG. 6, a MS 30 moving from cell A into cell D would determine that two different tag values are valid in cell D. Thus, upon entering cell D, the MS would have to read system information blocks 55 corresponding to tag values 5 and 31 from slave channels in cell D (unless blocks corresponding to tag values 5 and 31 had previously been read and stored/cached by the MS). In still further embodiments, three or more tag values may be valid at a given time in a cell. As evident from FIG. 6, a system operator may dynamically change the tag values in cells throughout a network during network operation so as to manipulate system parameters to accommodate new and/or changed parameters that the operator desires to implement.

Figure 7:
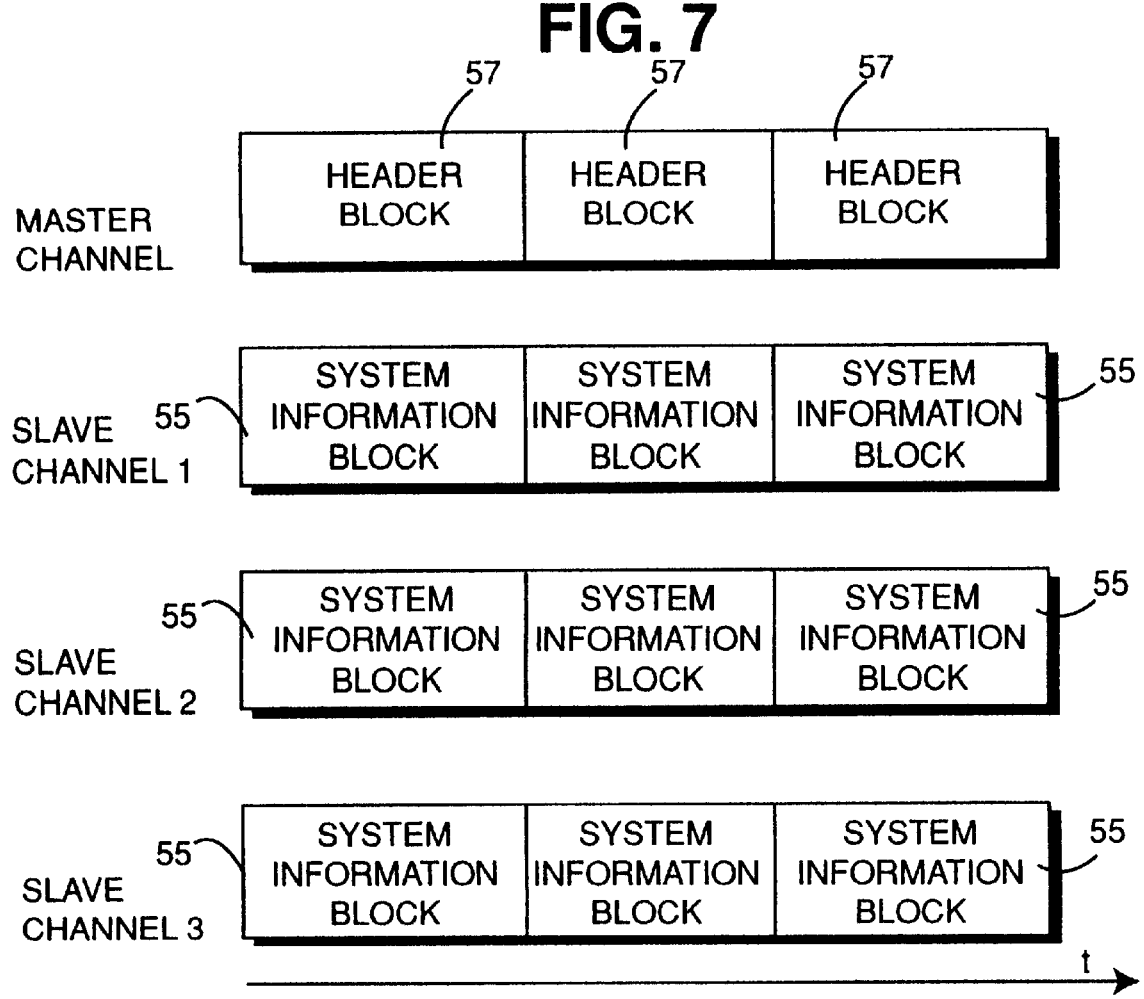
FIG. 7 illustrates a plurality of different control channels which may be utilized in the system/network of FIGS. 1–6.
Figures 11, 12:
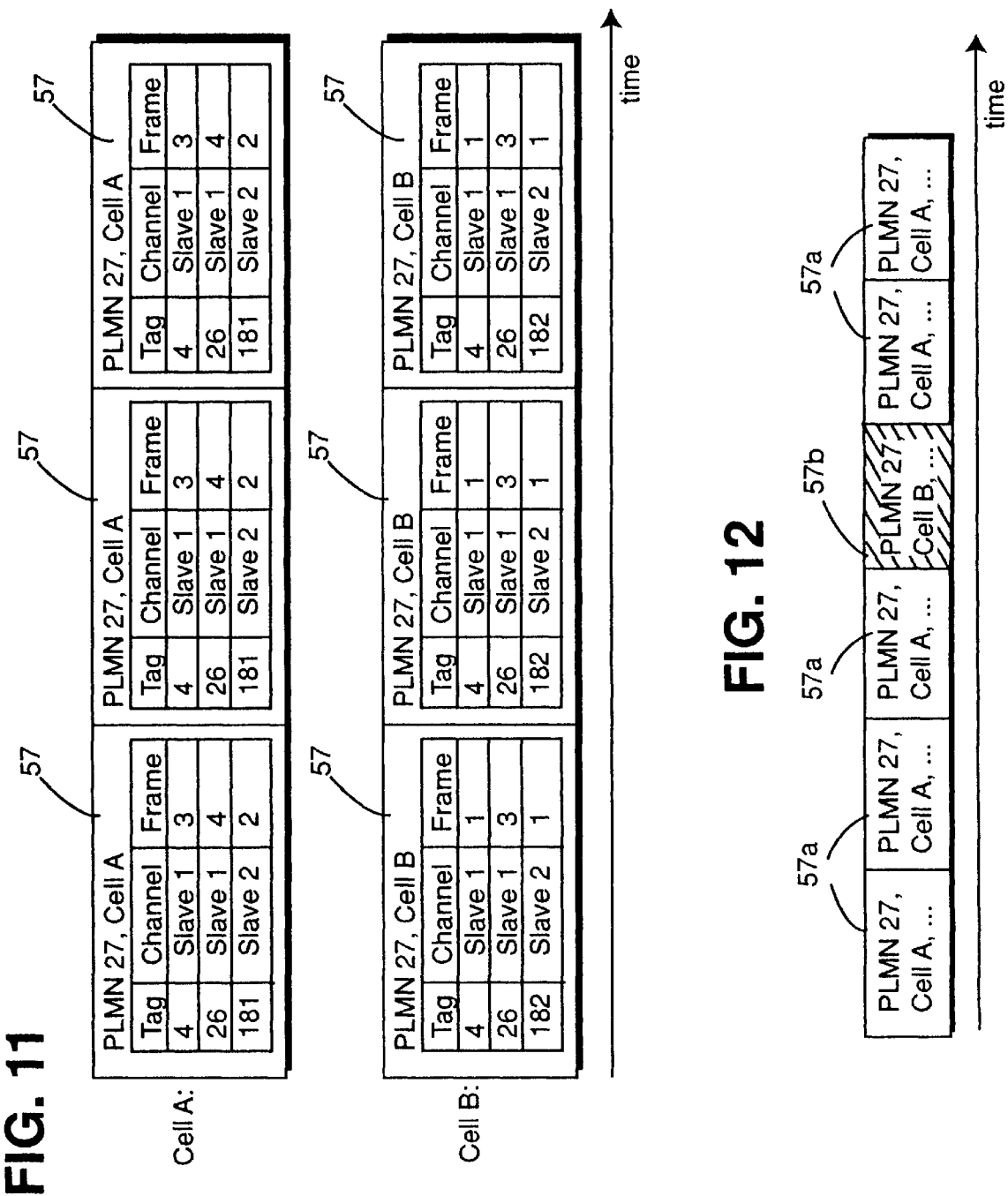
FIG. 11 illustrates first and second header blocks transmitted on respective master control channels in first and second cells of the network/system of FIG. 1, each block including slave channels and/or scheduling information relating to particular valid tag values.
FIG. 12 is a block diagram according to an embodiment of this invention, illustrating that a base station may transmit header blocks on a master control channel for both the cell defined by that base station and also for adjacent cell(s).

FIG. 7 illustrates exemplary header blocks (also referred to herein as master information blocks) 57 transmitted by an exemplary BS 15, 28 on a master control channel, and exemplary system information blocks 55 transmitted by the BS on slave channels 1—3. In certain embodiments of this invention, header blocks 57 transmitted on the master channel may specify location and/or parameters of system information blocks 55 transmitted on slave channel(s). For example, a header or master information block 57 for indicating that tag value 4 is valid may also include information for informing receiving mobile stations 30 when and where system information blocks 55 including the parameter settings for tag value 4 are transmitted (i.e., on what slave channel and at what time/frame on that channel). This concept is illustrated in FIGS. 8 and 11 (i.e., the master information block 57 may include information directing a receiving MS to the appropriate slave channels and/or system information block(s).

Figure 8:
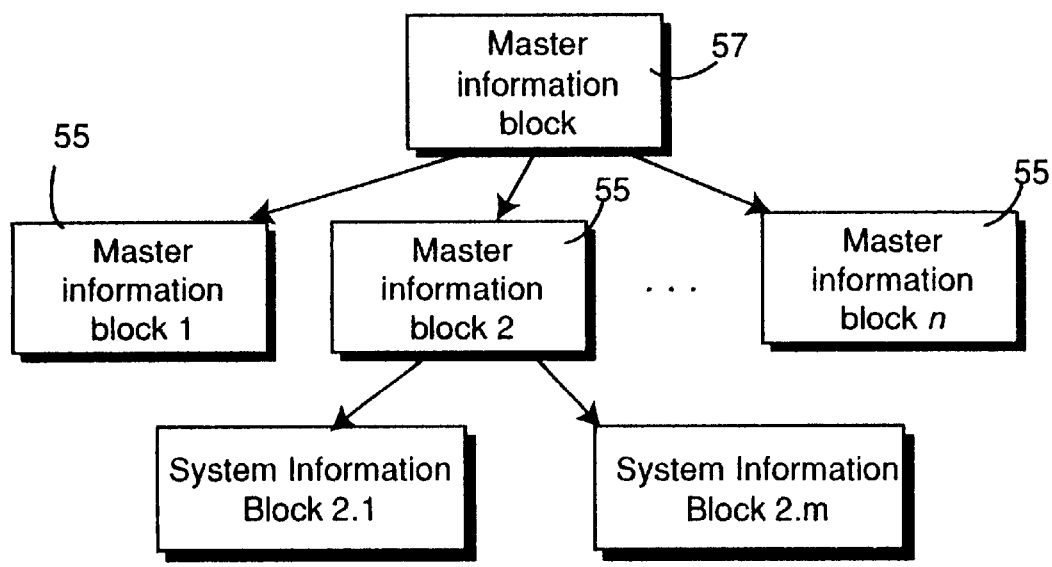
FIG. 8 is a schematic illustrating that master information blocks transmitted on a master control channel may include information directing mobile stations to particular slave channels and system information blocks transmitted thereon.

While FIGS. 7–8 illustrate blocks 55 and 57 being transmitted by base stations on different control channels, this need not be the case in all embodiments of this invention. For example, in certain alternative embodiments, header blocks 55 and 57 may be broadcast or otherwise transmitted on the same channel.

Figure 9:
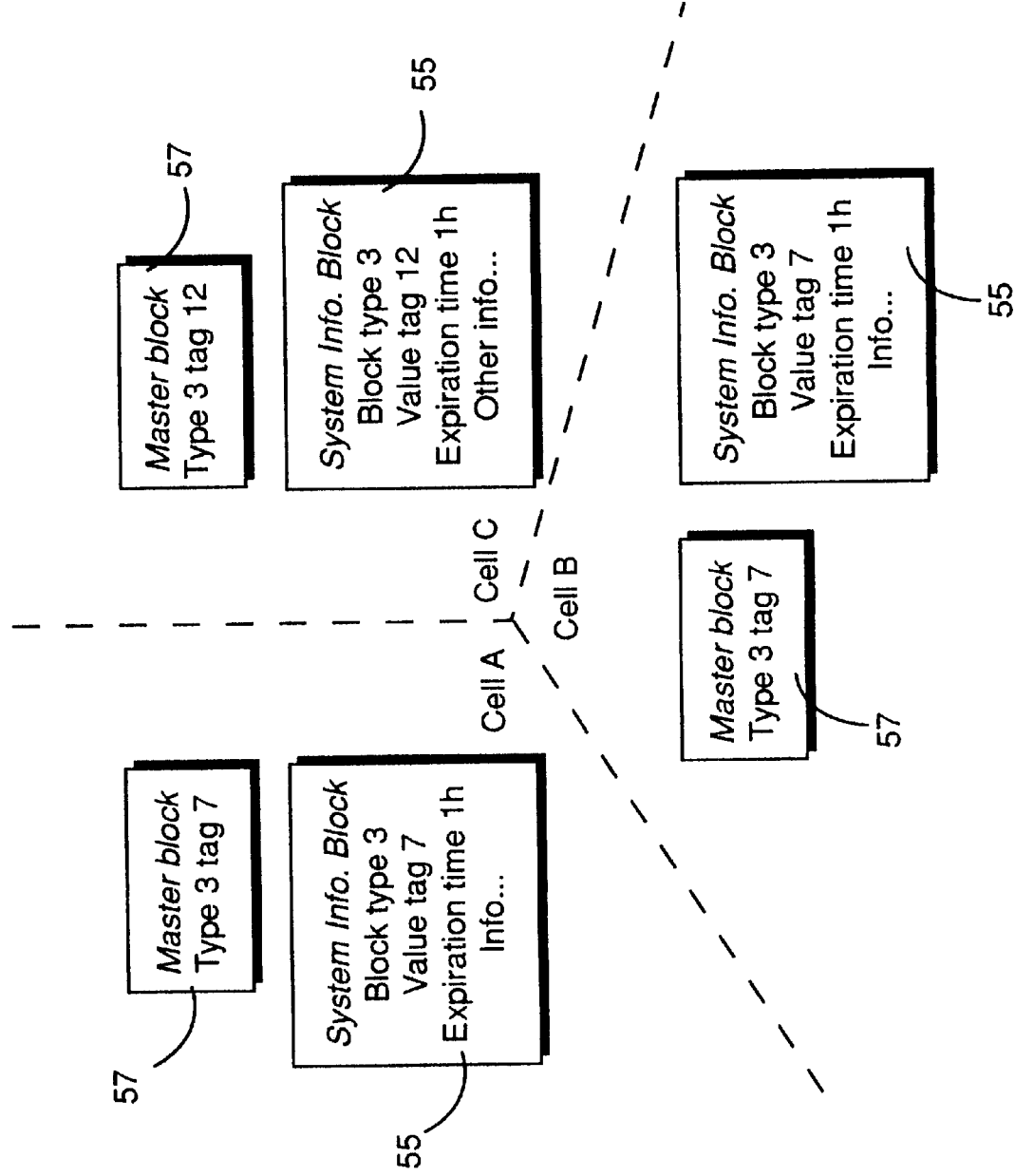
FIG. 9 is a schematic diagram illustrating three different cells of a system/network according to an embodiment of this invention, wherein the same tag value (and thus the same system information parameters corresponding thereto) is/are valid in two of the three cells.

FIG. 9 illustrates an implementation of an exemplary embodiment of this invention relating to system information parameters which may be shared over cell borders. Certain types of system information, such as core network information, may be the same in many cells. To avoid re-reading such information at cell changes, system information blocks 55 including such information may have long expiration times (to be discussed more fully below), and/or relatively large value tags (large value tags may correspond to long expiration times in certain embodiments). By using the same tag value(s) in cells that are similarly configured, mobile stations 30 may avoid re-reading system information blocks 55 at cell change. By using relatively large tag values, many areas with mutually different information may be formed. As shown in FIG. 9, cell A and cell B use the same tag value 7. Thus, mobile stations 30 moving between cell A and cell B do not have to re-read the system information block corresponding to tag value 7. However, cell C utilizes different system information value(s) and thus has a different valid tag value 12. Thus, mobile stations moving between, for example, cells B and C must read a system information block corresponding to tag value 12 upon entering the new cell C (unless it is already stored by the MS).

Figure 10:
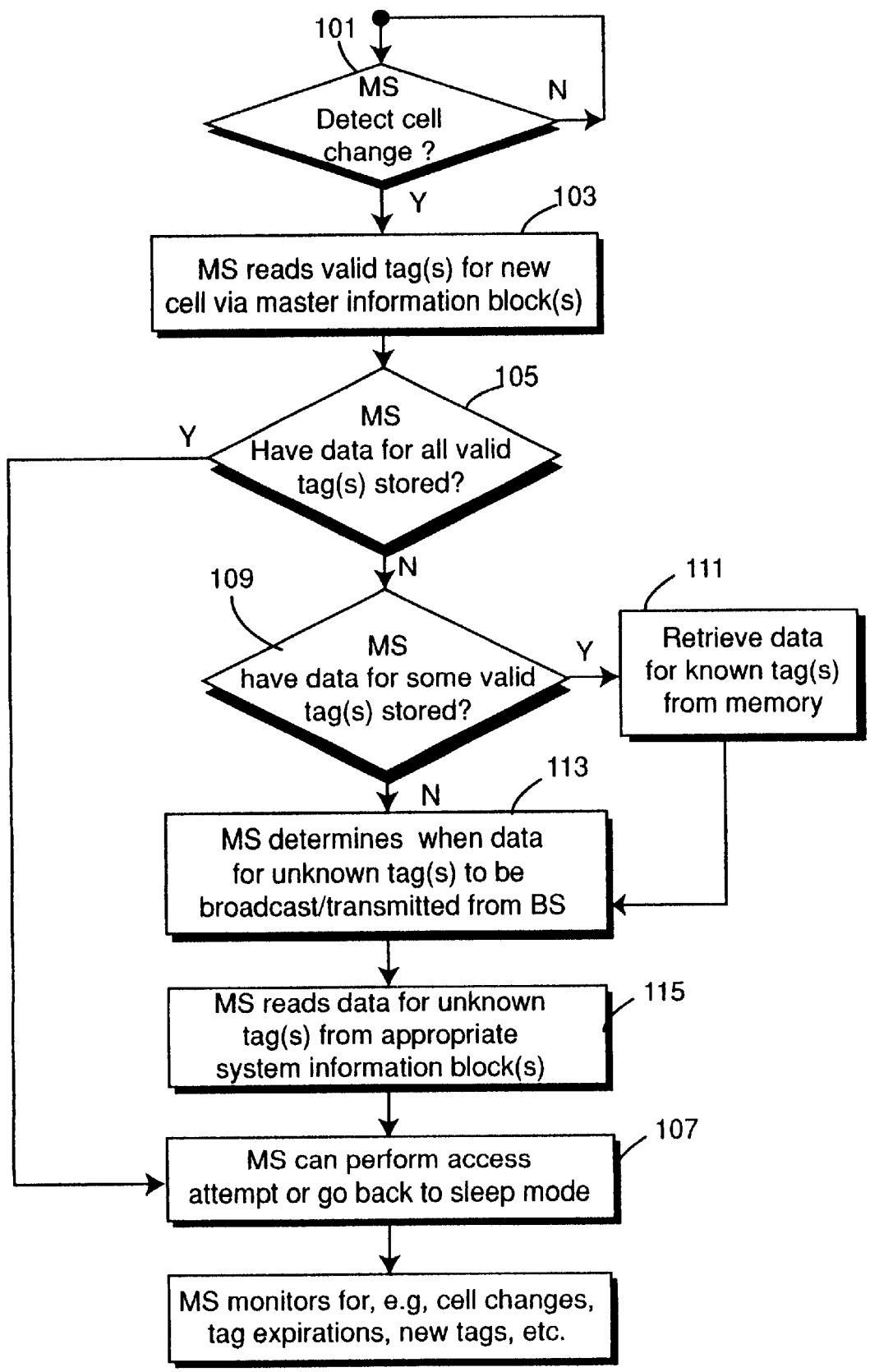
FIG. 10 is a flowchart illustrating steps taken by a mobile station (MS) upon making a cell change in accordance with an exemplary embodiment of this invention.

FIG. 10 is a flowchart illustrating certain steps taken according to an embodiment of this invention when a MS 30 moves from one cell to another cell. At step 101, it is determined whether a cell change is made (e.g., whether the MS locks onto a new master control channel). If so, the MS 30 reads the valid tag(s) in the received header block 57 for the new cell (see step 103) on the new master control channel. The MS analyzes the received valid tag value(s) by determining whether it has already stored in its memory 43 unexpired system information block(s) 55 corresponding to the valid tag value(s) for the new cell (see step 105). If so, there is no need for the MS to re-read the same information, and the MS may immediately perform an access attempt or return to a sleep or idle mode (see step 107). However, if it is determined at step 105 that the MS has read new tag values for which non-expired system information blocks 55 are not stored by the MS, then the MS determines whether it has stored system information blocks 55 for only some of the tag values (see step 109) valid in the new cell. If so, then the MS retrieves the system information blocks 55 and corresponding system information parameters which it has already stored for those valid tags (see step 111). The MS then determines, via header block(s) 57, when the system information blocks 55 for the new or unknown valid tag values are to be broadcast or transmitted from the base station for the new cell (see step 113). The MS 30 then reads the appropriate system information block(s) 55 which correspond to the new tag value(s), from the appropriate slave channel (see step 115). Once the MS has stored the parameters corresponding to all valid tag(s) in the new cell in which the MS is located, it may perform an access attempt, or return to a sleep or idle mode (see step 107). The MS 30 may then monitor for cell changes, tag expirations, the presence of new tags in master blocks in the same cell, or any other indication that new system parameters blocks need to be read.

Referring to FIG. 11, each header block 57 may include, for example, a PLMN identifier, a cell identifier, a list of system information blocks associated with valid tags identified in the header block (i.e., a list of blocks 55 currently in use in the cell), a value tag, and scheduling (e.g., time/frame and slave channel) information relating to when and where the corresponding system information block(s) are transmitted by the BS in the cell. At each time instant, a set of information blocks 55 is in use in a cell. A list of these blocks 55 is repeatedly broadcast by the BS in the cell on, e.g., the BCCH, in the form of master information block(s) 57. The master information block 57 is preferably broadcast with a relatively high, pre-defined repetition rate. Different blocks 55 may be broadcast with different repetition rates. It is thus possible to broadcast large amounts of system information via blocks 55 at low rates without interfering with the broadcasting of blocks 57 that use higher rates.

The PLMN identifier (e.g., PLMN 27) enables a MS 30 receiving the header block 57 to know which network it is connected to. Generally, a MS may need to know which network it is connected to before it can evaluate the tags that are broadcast in a cell. Moreover, each network operator can thus plan the use of tags independently of other operators in other networks without risking a roaming MS using a block that was cached in the wrong network (PLMN). Moreover, each header block 57 may contain a cell identifier so that a receiving MS realizes in which cell it is located, or alternatively which cell in the network the block corresponds to.

Still referring to FIG. 11, each header block 57 may include a list of all tags which are valid in the cell to which the header block 57 belongs. For example, in cell A in FIG. 11, the header blocks 57 indicate that tag values 4, 26, and 181 are all valid. The header blocks 57 for cell B indicate that tags 4, 26, and 182 are valid in cell B. Each header block 57 may also identify the slave channel(s) utilized in that cell for broadcasting the system information blocks 55 corresponding to each valid tag value. Referring to FIG. 11, it can be seen that in cell A, slave channel 1 broadcasts the system information blocks 55 which include the relevant parameters corresponding to tag values 4 and 26; while slave channel 2 is utilized by the BS to broadcast the parameters corresponding to tag value 181. In such a manner, the receiving MS knows which slave channel to address in order to read the required system information blocks 55 which may relate to new tag values not previously cached or stored. Moreover, each header block 57 may include information allowing a receiving MS to determine the time for the next transmission of a corresponding system information block 55, and/or relevant frames in which the block is to be transmitted.

Referring to FIG. 12, header blocks typically contain information valid in the cell where the blocks are broadcast. However, in certain embodiments described herein, a base station in a cell may occasionally broadcast header blocks 57b and corresponding system information blocks 55 that actually belong to neighboring cells in order to facilitate quicker and/or more efficient cell changes. In such cases, the header block should identify which cell it belongs to, either by the cell identity, by radio channel scrambling code, or in any other suitable manner. This way, the MS may not be required to read the Broadcast Control Channel (BCCH) at all when changing to the new cell with identical system information. This facilitates fast changes when a MS moves from one cell to another, where the cells have slightly different parameter settings, even if they have not been visited recently. If the neighboring cell(s) uses system information blocks 55 not used in the serving cell, these blocks may still be broadcast in the serving cell, preferably with a longer repetition interval. The MS could then choose to read this information and store it in advance in memory 43, before moving into the new cell. If the MS 30 later moves to the neighboring cell, it already has all or most of the system information necessary for that cell. FIG. 12 illustrates header blocks 57 transmitted on a master control channel in a particular serving cell. As shown, the base station of the serving cell transmits both header blocks 57a which corresponds to the serving cell, as well as header block 57b which relate to a neighboring cell. As illustrated, the transmission interval for the neighboring cell header block 57b is substantially greater than the interval for header blocks 57a for the serving cell itself.

Figure 13:
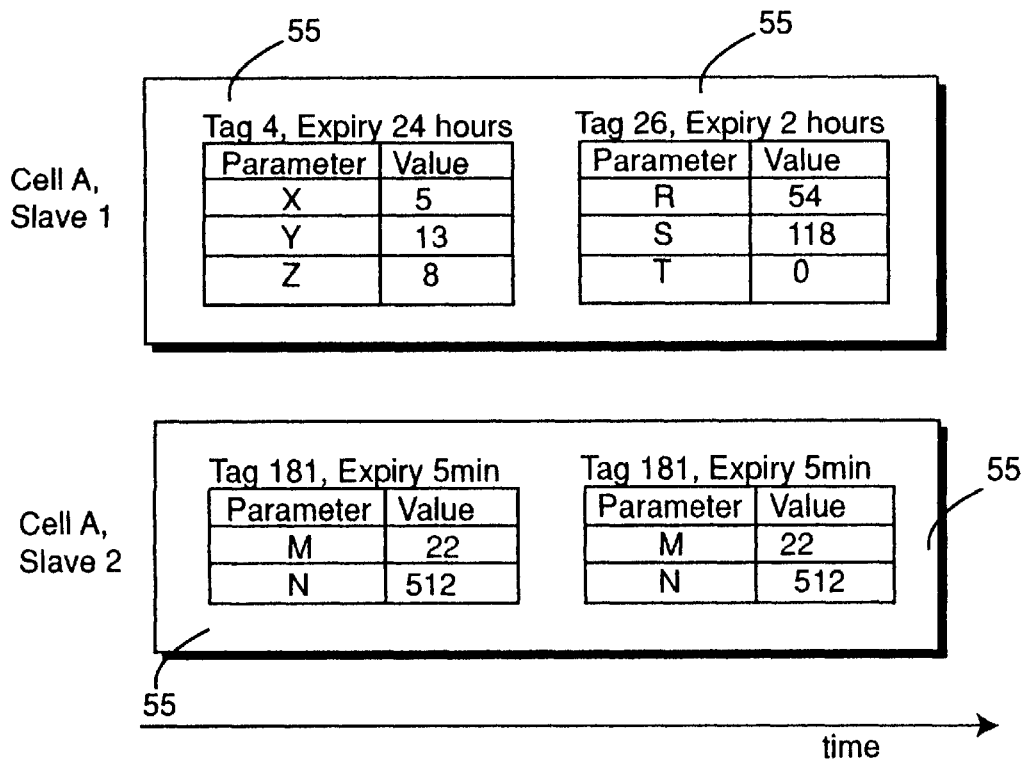
FIG. 13 illustrates system information blocks according to an embodiment of this invention, including system information blocks with parameters transmitted on first and second slave control channels in a cell of the system/network of FIG. 1.

FIG. 13 illustrates exemplary system information blocks 55 to be broadcast in cell A, on slave channels 1 and 2, respectively. As illustrated, each system information block 55 may include a tag value, an expiration time, and a list of system information parameter values which correspond to the listed tag value. In this particular example, slave control channel 1 is broadcasting blocks 55 which correspond to tag values 4 and 26, while slave channel 2 is broadcasting blocks 55 which correspond to tag value 181.

Still referring to FIG. 13, a different expiration time is listed for each tag value. In this regard, when dealing with cached or stored information, precautions are sometimes necessary to avoid using cached information that has become invalid for some reason. For example, some parameters may change as a consequence of operator actions, and/or other parameters may change automatically depending upon traffic, load, interference, etc. In such cases, new tags may be used to inform mobile stations 30 that old cache values should no longer be used. However, it is often necessary to re-use old tag values as discussed herein. To allow this without risking extremely old cache blocks being used by mistake, and for added safety, an expiration time may be provided in each system information block 55 as shown in FIG. 13. Receiving mobile stations 30 may use values from blocks 55 up until a time when the relevant expiration time expires, after which the values are not longer used and are preferably deleted from memory. The MS then has to re-read the information.

Each system information block 55 preferably includes one or more system information parameters (e.g., X, Y, and/or Z) corresponding to the tag value (e.g., 4) of the block, along with the appropriate parameter values as shown in FIG. 13. This may be done by predefining specific block types with their set of parameters and/or by including in each block 55 a unique identifier for each parameter or by a bit map that indicates what parameters are included in a specific block.

In certain embodiments, some blocks 55 may be specified by a standard, but network operators may also be provided with a mechanism to define their own system information block 55 types. A block type may be valid in an entire cellular network, but need not be used in all cells. Preferably, system information block type definitions corresponding to cellular operator defined types are broadcast to cells at relatively slow repetition rates. A definition may include, for example, a list of the parameters or other information elements that are included in blocks of that type. The actual encoding of the type definition may vary, e.g., a list, a bitmap, etc. If new parameters are added after a standard is set, they may be given new parameter identities and placed at the end of the blocks so that old stations 30 can still read the blocks and use the parameters they understand. In addition, to accommodate roaming between two or more networks, a MS 30 may store block types for different cellular networks.

Each system information block, in certain embodiments, may include the following fields: block type, expiration time, value tag, and/or parameter value(s). The block type refers to a block type definition that specifies what system information elements or parameters are included in the block, as well as a default expiration time, the size of the value tag, and the scope of the block 55. The scope is the area where the block 55 may potentially be used; it may be either the cell where the block is broadcast or the PLMN. In the case of PLMN scope, the block 55 may be used in other cells in the same PLMN, depending on the value tags as discussed herein. The expiration time, of course, indicates how long the parameter values may be used by a MS without being re-read. If this field is not present in a block 55, then a default expiration time may be used by the MS. Thus, a MS that receives a block 55 may use the parameter values in the block so long as: 1) the expiration time has not expired or passed, 2) the current cell is within the scope of the system information block 55, and 3) the block type and value tag (if present) are currently valid in the current cell in which the MS is located as indicated by the master block 57.

Figure 14:
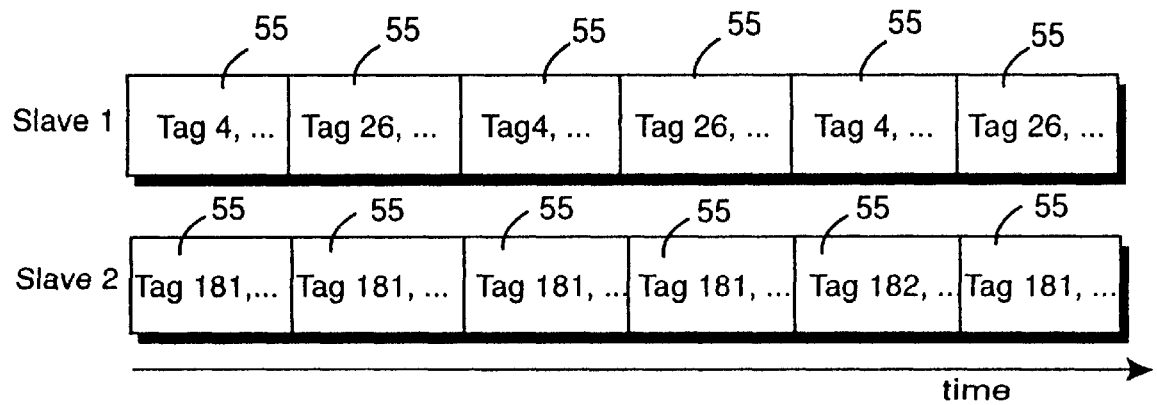
FIG. 14 illustrates that each tag value may have a different timing interval on a given slave control channel in certain embodiments of this invention.

FIG. 13 illustrates a BS using two different slave channels to broadcast three different system information blocks 55 relating to tags valid in the cell in which the BS is located. In other embodiments, a BS may also broadcast or transmit blocks 55 for neighboring cells (e.g., in FIG. 14, see block 55 corresponding to tag value 182 which is valid in a neighboring cell but not in the cell in which the transmitting BS is located). In the FIG. 14 embodiment, most of the blocks (tag values 4, 26, and 181) transmitted by the BS relate to tags valid in the cell of the BS (i.e., cell A), but occasionally, blocks 55 related only to other or neighboring cells are transmitted (in this example, the block 55 including tag value 182 which is used in cell B). The transmission interval for neighboring cell blocks 55 is preferably greater than for blocks 55 including values for tags valid in the serving cell. Thus, stations 30 may store blocks 55 that are not presently used because their tags are not listed in the current cell, in the hope that these stored blocks 55 may be suited for other cells in the future which the MS may visit. Consider the example where an MS has recently visited a cell with a certain parameter setting and now visits a cell with a different setting. A block 55 from the recently visited cell may not be useful in the current cell. Nevertheless, the block 55 from the recently visited cell may be stored in memory 43 in anticipation that the MS may reenter that cell or visit another cell with the same setting(s). Indeed, broadcast system information blocks 55 not used in a current cell but which are used in a neighboring or adjacent cell may be broadcast as in FIG. 14 so that the MS can store such blocks in the hope that they will be useful in the future. However, it is noted that for some system information parameters, caching or storing may not be desirable (e.g., for parameters that are constantly updated such as cell load), and instead direct broadcasting may be stable.

Each MS 30 maintains in memory 43, a list of system information parameter values that are currently valid in the serving cell (i.e., the cell in which the MS is located), a list of tags that are currently valid in the serving cell, and/or the system information blocks that are currently valid in the serving cell. Additionally, each MS 30 may also store system information blocks 55 that it has received, as long as the respective expiration times have not expired. Optionally, each MS may also store a currently valid tag list of neighboring cell(s).

Each time a header block 57 is read for the cell in which the MS is located, the block tag list is compared with the previously stored list. If any tags have been removed, the corresponding parameters are considered as unknown until received in a valid system information block 55. If any new tags have appeared (e.g., because of movement by the MS into a new cell), the MS searches its memory 43 for a stored block with a matching tag. If one is found (and its expiration time has not passed), the corresponding information is entered into the parameter list. If the tag is not found, the MS locates and reads the system information block from the appropriate broadcast slave channel indicated in the master block.

Certain advantages may be realized in accordance with certain embodiments of this invention. In certain embodiments, an MS 30 does not have to re-read identical system information when changing cells or otherwise, if such information has been previously read and stored by the MS, and has not expired. This saves radio resources and reduces battery consumption in the MS, thereby improving standby time. In certain embodiments, the delay of reading new system information at cell change is reduced by re-using stored system information blocks 55. Only new system information blocks 55 (i.e., which correspond to newly valid tag values) need be read upon making a cell change in certain embodiments. Moreover, master blocks 57 may inform a receiving MS as to exactly when and where the new system information blocks 55 are to be transmitted by the base station of the new cell. In certain embodiments, the sequential transmission order of system information blocks 55 can be changed dynamically during network operation. Mobile stations 30 may be informed of the time schedule in a system information message broadcast in each cell. In yet further embodiments, a division of system information parameters into blocks can be set by a network operator. It is thus not necessary to anticipate in advance exactly what parameters will be varying in the future. Thus, high flexibility, low MS power consumption, and/or low resource requirements over the radio/air interface maybe achieved.

FIG. 15 is a graph illustrating an exemplary implementation of an embodiment of this invention in a given cell, relating to system information parameters which are updated on a relatively infrequent basis, so that relatively long expiration times may be used. Parameters which are seldomly updated include, for example, neighboring cell relationships and/or certain physical channel parameters. Such information often only have to be read at cell changes, unless a cell is reconfigured in which case all mobile stations 30 have to re-read that system information. Because such parameters rarely change, they may be placed in one or more system information blocks 55 having a long expiration time(s) and/or relatively small tag size value (e.g., two bits). A MS 30 entering a new cell will detect the presence of such a system information block 55 by reading the master information block 57 on the master control channel. Assuming that the MS has not previously stored the system information parameters corresponding to the valid tag of the new cell (e.g., tag value 3 in FIG. 15), the MS will then read the system information block 55 once and use it (or at least use it and/or store it) for the expiration time of one hour without having to re-read it via another block 55. If the information has to be changed because of a reconfiguration at 61, then the tag value in the master block 57 is changed (i.e., changed to 4 from 3 as shown at time T in FIG. 15) accordingly in the cell at issue. Then, mobile stations 30 in the cell are paged with an indication to re-read the master information block 57. The changed tag value instructs the receiving mobile stations 30 to discard the old system information block corresponding to tag value 3, and read the new one corresponding to tag value 4.

FIG. 16 is a graph illustrating an implementation of an embodiment of this invention relating to system parameters which are updated periodically, on a relatively frequent basis. Such parameters may include, for example, interference or traffic measurements. Such parameters may only be valid for a short time, and may thus be designed so as to be re-read by mobile stations 30 when needed or on a relatively frequent basis. This may be achieved by placing such system information parameters or elements into one or more system information blocks 55 which have no tag value, short expiration times, and/or high repetition rates. As can be seen in FIG. 16, no tag values are provided in the system information blocks 55 of FIG. 16, and the expiration time is a mere one second for each block. By setting the expiration time of block type 2 to one second, receiving mobile stations 30 are forced to always use up-to-date information and thus re-read the system information block 55 of type 2 every second if it needs that type of information. In certain embodiments, the broadcast repetition interval may be set to the same time value as the expiration time as shown in FIG. 16, or alternatively the broadcasting repetition interval on a slave channel(s) may be shorter in order to reduce access delay times for newly arrived mobile stations.

The embodiments of FIGS. 15 and 16 may be used either alone or in combination with one another. When used in combination, some valid tag(s) in a cell may have block(s) 55 with a long expiration time(s), while other valid tag(s) in the cell may have block(s) with a short expiration time(s). Still further, other blocks 55 and/or 57 in the cell may have no tags at all as in the FIG. 16 embodiment (e.g., when very short expiration times are preferred).

The table of FIGS. 17(a) and 17(b) specifies system information blocks and a master block according to an exemplary implementation of an embodiment of this invention. The "area scope" column specifies the area where a block is valid. If the area scope is a cell, then a MS reads the block every time a new cell is entered. If the area scope is PLMN, then the MS need only check the value tag for the system information block when a new cell is entered as discussed above. If the value tag for the block in the new cell is different compared to the value tag for the system information block in the old cell just exited, the MS re-reads the system information block as discussed above.

The UE (user equipment or MS) mode/state column specifies in which MS mode or state the IEs in a system information block are valid. If the UE mode is "idle mode", then a MS uses the IEs given by the system information block in idle mode. If the mode is "connected mode" then the MS uses the IEs given by the system information block in connected mode. If the UE state is Cell_Fach, the MS uses the IEs given by the system information block when in state Cell-Fach, and so on. The transport channel in FIG. 17 specifies where the blocks are broadcast (i.e., on what channel by a BS). If the transport channel is BCH, then a MS reads the block on a BCH transport channel, and so on.

The scheduling information column in FIG. 17 specifies the position and repetition period for the SIB. In certain embodiments, scheduling of system information blocks may be performed by the RRC layer in UTRAN. If segmentation is used, it may be possible to schedule each segment separately.

In certain embodiments, different rules may apply for the updating of different types of system information blocks. If a system information block has a value tag in the master information block or higher level system information block, UTRAN may indicate when any of the information elements are modified by changing the value of a value tag. When system information is modified, UTRAN may perform the following actions to indicate such changes to mobile stations: (1) update the actual system information in a corresponding system information block or blocks; (2) start to send the updated system information blocks on the BCCH instead of the old system information block; (3) if the updated system information block is linked to a higher level system information block, update the higher level system information block with the value tag of the modified system information block; (4) update the master information block with the value tag of the modified system information block and change the value tag of the master information block; (5) send the new master information block on the BCCH mapped on BCH instead of the old master information block; (6) send the new master information block on the BCCH mapped on FACH in order to reach all mobile stations in state CELL_FACH (UTRAN may repeat the new master information block on the FACH to increase the probability of proper reception in all mobile stations needing the information); (7) send the paging type message on the PCCH in order to reach idle mode mobile stations as well as connected mode mobile stations in state CELL_PCH and URA_PCH; and (8) system information need not be changed more frequently than can be accommodated by mobile stations operating at the maximum DRX cycle links supported by the UTAN.

For modification of some system information elements (e.g., reconfiguration of channels), it may be important for mobile stations to know exactly when a change occurs. In such cases, the UTRAN may perform the following actions to indicate the change to mobile stations: (1) send the message PAGING TYPE 1 on the PCCH in order to reach idle mode mobile stations as well as connected mode mobile stations in different states (in the IE "BCCH modification information", UTRAN may indicate the time when the change will occur and the new value tag that will apply for the master information block after the change); (2) send the message "system information change indication" on the BCCH mapped on FACH in order to reach all mobile stations in state CELL_FACH (this may be repeated in certain embodiments); (3) update the actual system information and change the value tag in the corresponding system information block; (4) update the master information block with the value tag and change the value tag of the master information block; and (5) at the indicated time, start to send the new master information block on the BCCH mapped on BCH instead of the old master information block and the updated system information block on the BCCH instead of the old system information block.

While the present invention has been described in terms of particular embodiment, those skilled in the art will recognize that the present invention is not limited to the specific example embodiments described and illustrated herein. Different formats, embodiments, and adaptations besides those shown and described as well as many modification, variations, and equivalent arrangements may also be use to implement the invention.

What is claimed is:

1. A method of transmitting control information in a cellular telecommunications network including a first base station in a first cell and a second base station in a second cell, the method comprising:

transmitting first control information and second control information from the second base station in the second cell; and upon making a cell change by entering the second cell from the first cell and reading the first control information transmitted from the second base station in the second cell, the mobile station determining whether or not to read the second control information based upon analysis by the mobile station of the first control information read by the mobile station, so that the mobile station can use the second control information in the second cell without having to read the second control information from the second base station in the second cell when the mobile station determines that the mobile station is already storing the second control information that it received in another or previous cell.

2. The method of claim 1, wherein the first control information comprises at least one tag value that is valid in the second cell, and the second control information comprises at least one system information parameter value that corresponds to the valid tag value.

3. The method of claim 2, wherein the first control information further comprises a header block including the at least one tag value that is valid in the second cell, a network identifier, and a cell identifier.

4. The method of claim 3, wherein the first control information is transmitted on a first channel and the second control information is transmitted on a second channel different than the first channel, and wherein the first control information further comprises an identity of the second channel on which the second control information is to be transmitted.

5. The method of claim 3, wherein the first control information further comprises first, second, and third tag values that are valid in a cell in which the mobile station is located and identities of multiple channels on which system information blocks which correspond to the tag values are to be transmitted.

6. The method of claim 2, wherein the second control information includes a tag value that is valid in each of the first and second cells, and system information parameter values that correspond to the tag value.

7. The method of claim 6, wherein the second control information includes an expiration time for a control block including the system information parameter values that correspond to the tag value.

8. The method of claim 1, further comprising the second base station located in the second cell and transmitting control information relating to a third cell neighboring the second cell.

9. The method of claim 1, wherein the second control information includes an expiration time for a control block including system information parameters.

10. A method of utilizing control information transmitted in a cellular telecommunications network from a base station to a mobile station, the method comprising:

transmitting first control information and second control information from the base station; and upon making a cell change and reading the first control information from the base station in a new cell, the mobile station determining whether or not to read the second control information based upon analysis of the first control information, so that the mobile station need not read the second control information in the new cell if the mobile station determines that the mobile station is already storing the second control information that it received in a previous cell, so that the mobile station can use the second control information in the new cell without having to read the second control information from the base station in the new cell when the mobile station determines that the mobile station is already storing the second control information that it received in another cell.

11. The method of claim 10, wherein the first control information comprises at least one tag value that is valid in the new cell, and the second control information comprises at least one system information parameter value that corresponds to the valid tag value; and wherein the first control information and the second control information are transmitted on the same control channel.

12. The method of claim 11, further comprising the steps of:

the mobile station reading the tag value upon entry into the new cell; the mobile station analyzing the tag value by determining whether or not the mobile station has stored or cached system information parameter value(s) corresponding to the tag value; and the mobile station determining whether or not to read the second control information based upon whether the mobile station has stored or cached system information parameter value(s) corresponding to the tag value.

13. A method of utilizing control information in a cellular telecommunications network including first and second cells in which first and second base stations are located, respectively, the method comprising:

when in a first cell, the mobile station receiving a tag value and system information parameter values corresponding to the tag value from the first base station;

the mobile station moving from the first cell into the second cell; andwhen in the second cell, the mobile station receiving a tag value from the second base station and determining whether the tag value received by the mobile station from the second base station corresponds to a tag value stored by the mobile station, and if so the mobile station utilizing the system information parameter values corresponding to the stored tag value without having to re-read the system information parameters in the second cell, so that the mobile station can use the system information parameters in the second cell without having to read the parameters from the second base station in the second cell when the mobile station determines that the mobile station is already storing the parameters that it received in another previous cell.

14. A network comprising:

a mobile station;

a base station that transmits first control information and second control information; and wherein the mobile station determines, upon making a cell change into a new cell in which the base station is located and reading the first control information from the base station, whether or not to read the second control information based upon analysis of the first control information, so that the mobile station may use the second control information in the new cell without having to read the second control information from the base station in the new cell if the mobile station determines that the mobile station is already storing the second control information.

15. The network of claim 14, wherein the first control information and the second control information are transmitted by the base station to the mobile station on different control channels.

16. The network of claim 14, wherein the first control information comprises at least one tag value that is valid in the new cell, and the second control information comprises at least one system information parameter value that corresponds to the valid tag value.

17. The network of claim 16, wherein the mobile station reads the tag value upon entry into the new cell and determines whether or not the mobile station has stored or cached system information parameter value(s) corresponding to the tag value, and wherein the mobile station determines whether or not to read the second control information from the base station in the new cell based upon whether the mobile station has stored or cached system information parameter value(s) corresponding to the tag value.

18. A method of using control information transmitted from a base station to a mobile station in a cellular telecommunications network, the method comprising the steps of:

transmitting control information including at least one system information parameter value along with an expiration time to the mobile station;

the mobile station receiving and using the control information; and the mobile station not using the control information after the expiration time has expired.

19. The method of claim 18, further comprising the steps of:

the base station transmitting a list of tag values that are valid in a cell in which the base station is provided; and wherein the system information parameter value corresponds to at least one of the tag values that is valid in the cell in which the base station and mobile station are located.

20. A cellular telecommunications network comprising:

a mobile station and a base station each located in a cell;

wherein the base station transmits control information including at least one system information parameter value along with an expiration time; and wherein the mobile station receives the control information from the base station and determines whether to use the system information parameter value based at least in part upon whether the expiration time has expired.

21. A method of transmitting control information to a mobile station in a first cell of a cellular telecommunications network, the method comprising:

a first base station transmitting control information to the mobile station in the first cell indicating to the mobile station that the control information is not valid in the first cell but is valid in a second cell.

22. The method of claim 21, further comprising the steps of:

the mobile station storing in memory the control information;

the mobile station moving into a second cell which neighbors the first cell; and the mobile station using the control information in the second cell without having to read the control information from a second base station in the second cell, because the mobile station had previously stored the control information.

23. A cellular telecommunications network comprising:

a first base station in a first cell;

a second base station in a second cell;

a mobile station moveable between the first and second cells; and wherein the first base station transmits first control information to the mobile station in the first cell including information indicating that the first control information is valid in the second cell but not in the first cell in which the first base station is located.

24. The network of claim 23, wherein:

the mobile station includes a memory for storing the first control information; and wherein when the mobile station moves into the second cell from the first cell the mobile station uses the first control information in the second cell without having to read the first control information from the second base station in the second cell.

25. The network of claim 24, wherein the first base station further transmits second control information to the mobile station in the first cell that is valid in the first cell and indicates to the mobile station that the second control information is valid in the first cell.

26. The network of claim 25, wherein the first base station transmits the first control information at a smaller repetition interval than the second control information.

27. A block of control information to be transmitted to a mobile station in a cellular telecommunications network, the block comprising:

system information parameter values that are valid in a particular cell of the cellular telecommunications network; and an expiration time after which the system information parameter values are not to be used by mobile stations in the network.

28. The block of claim 27, further comprising a block type field specifying what system information parameters are in the block and an area in which the block may be used.

29. The block of claim 27, further comprising a value tag field indicative of at least one tag value that is valid in said cell of the network.

30. A method of dividing a cellular telecommunications network into a plurality of different areas, the method comprising:

providing a plurality of cells in the cellular telecommunications network, each cell including a base station;

dividing the network in a first manner into a plurality of different cell areas, first and second ones of the cell areas not overlapping with one another and each including two or more of the plurality of cells;

all cells in the first cell area sharing system information, and all cells in the second cell area sharing system information;

broadcasting information to mobile stations indicative of the sharing of system information parameters by cells in the first and second cell areas; and dynamically changing system information parameters that are shared by the cells in the first cell area, and dynamically changing system information parameters that are shared by the cells in the second cell area, at respective points in time after the network has been installed and operational.

31. The method of claim 30, wherein all cells in the first cell area share a first common tag value that is indicative of a plurality of system information parameter values, and all cells in the second cell area share a second common tag value that is indicative of a plurality of system information parameter values.

32. The method of claim 30, further comprising, following said dividing step, re-dividing the network in a second manner that is different than the first manner, into a plurality of different new cell areas, first and second ones of the new cell areas not overlapping with one another and each including two or more of the plurality of cells;

all cells in the first new cell area sharing system information, and all cells in the second new cell area sharing system information; and broadcasting information to mobile stations indicative of the sharing of system information parameters by cells in the first and second new cell areas.

* * * * *